Jan. 12, 1965 A. W. SCHMID 3,165,391
APPARATUS FOR AND METHOD OF FORMING SHEET
GLASS BY VERTICAL DRAW MACHINE
Filed June 8, 1961 7 Sheets-Sheet 1
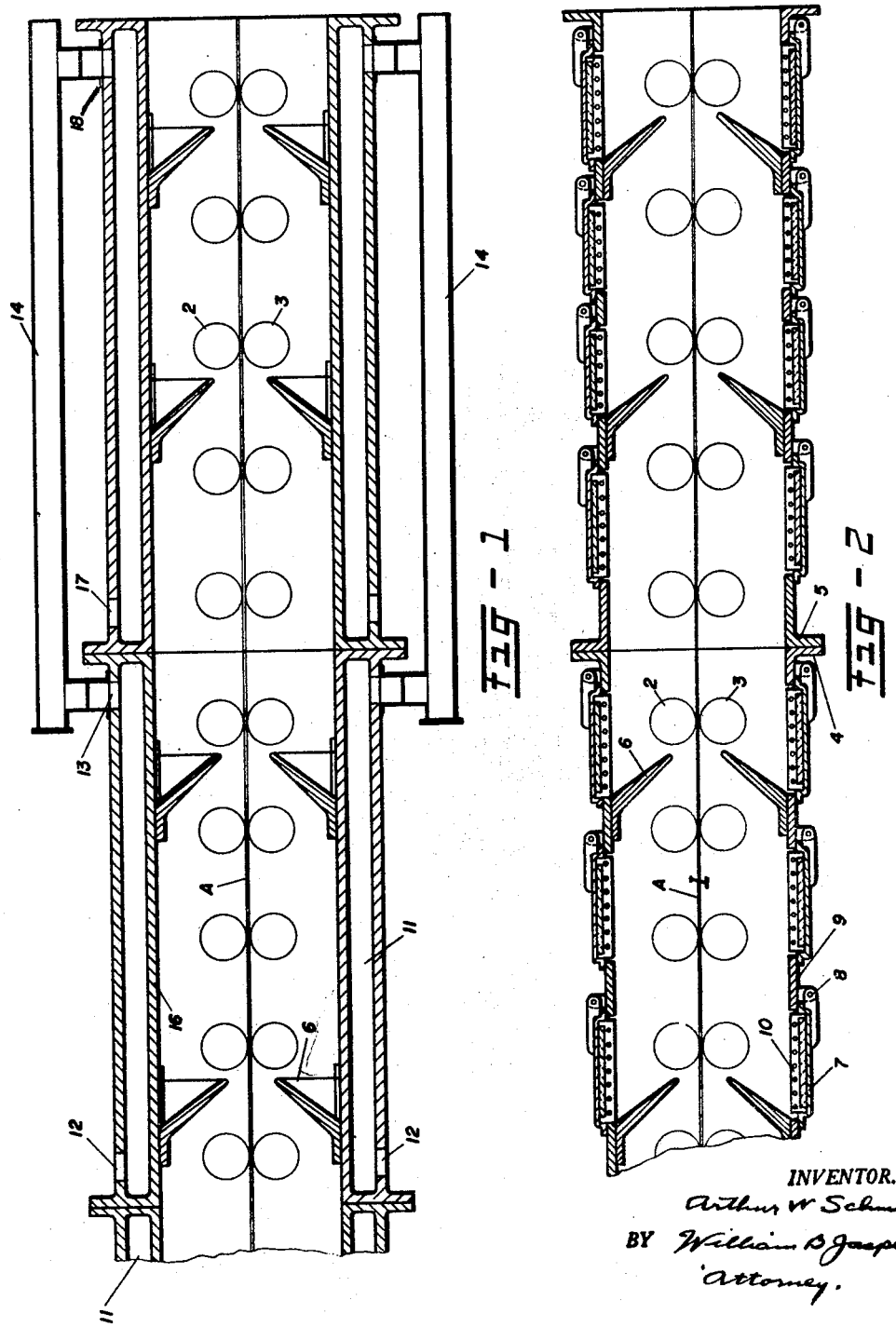
INVENTOR.
Arthur W Schmid
BY William B Jaspert
Attorney.

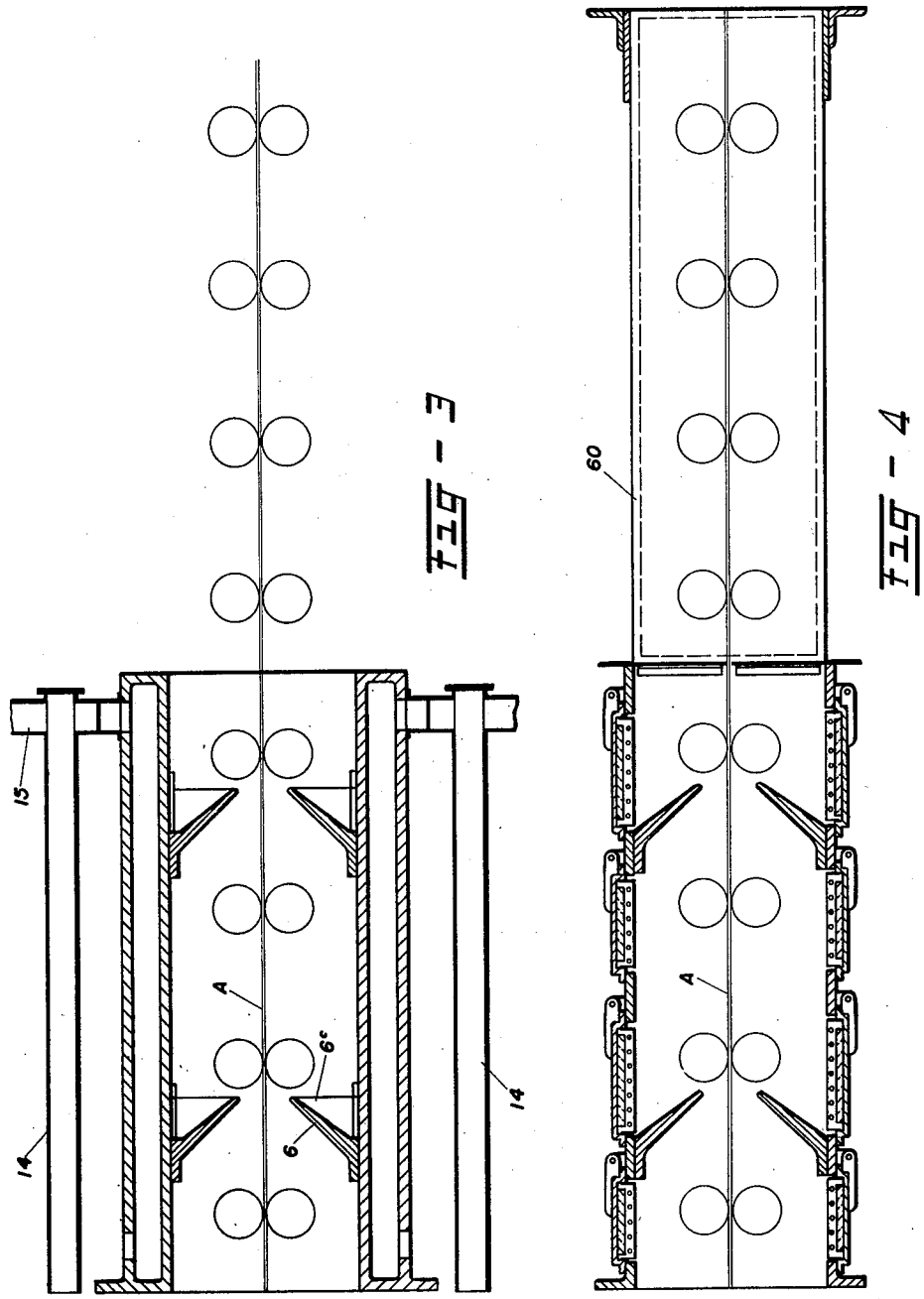

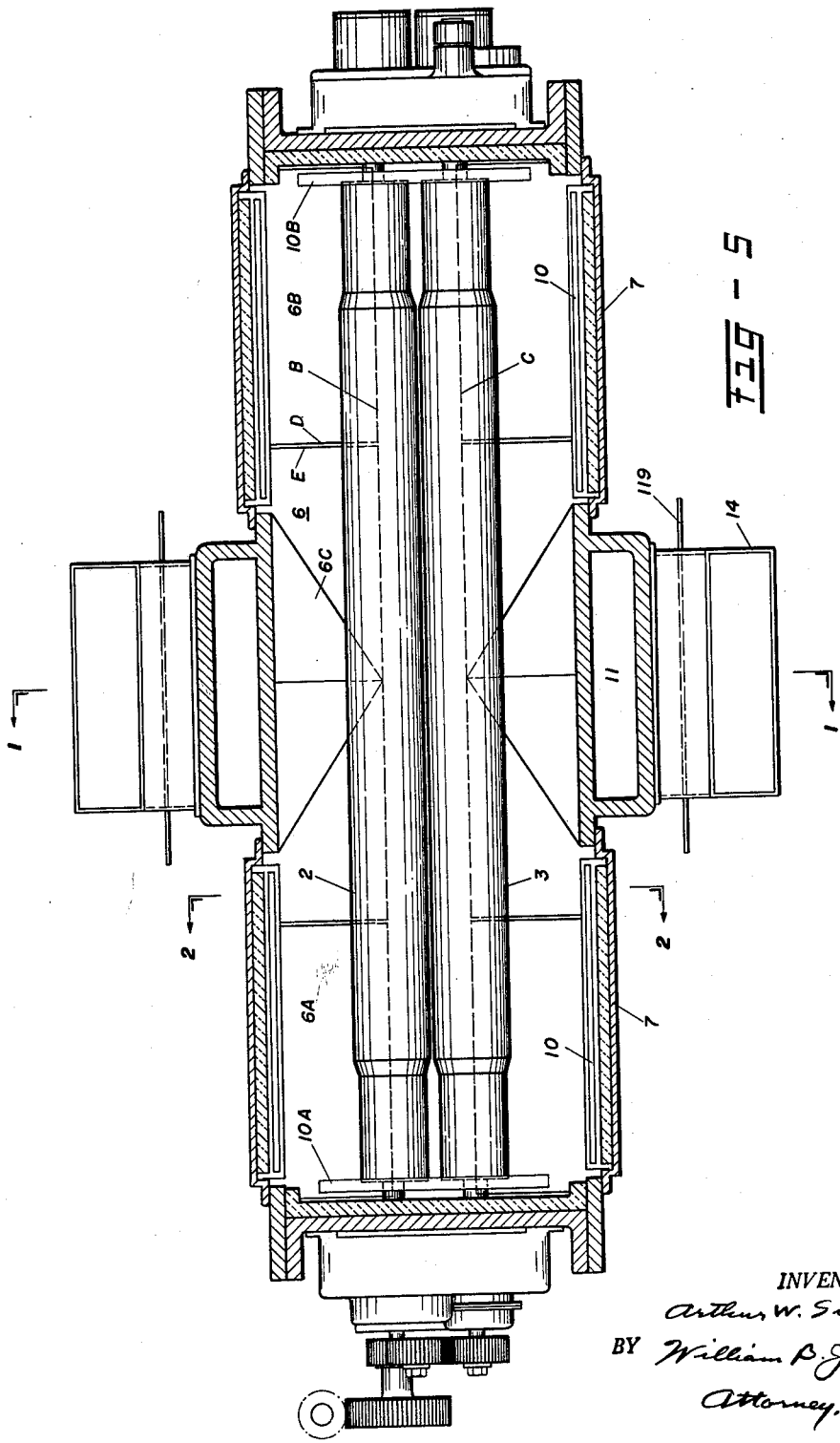

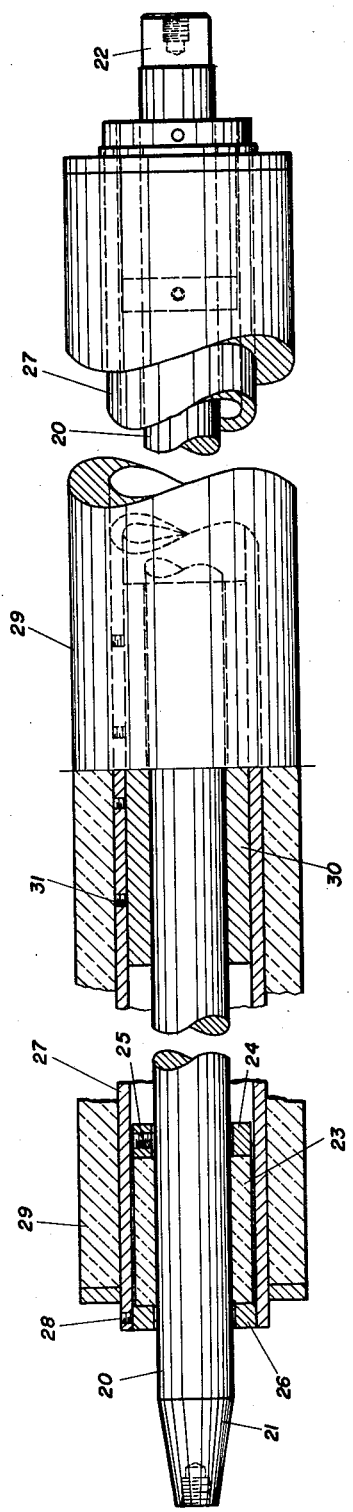

Jan. 12, 1965 A. W. SCHMID 3,165,391
APPARATUS FOR AND METHOD OF FORMING SHEET
GLASS BY VERTICAL DRAW MACHINE
Filed June 8, 1961 7 Sheets-Sheet 7

INVENTOR.
Arthur W Schmid
BY William B Jaspert
Attorney.

United States Patent Office 3,165,391
Patented Jan. 12, 1965

3,165,391
APPARATUS FOR AND METHOD OF FORMING
SHEET GLASS BY VERTICAL DRAW MACHINE
Arthur W. Schmid, 1743 Hastings Mill Road,
Pittsburgh, Pa.
Filed June 8, 1961, Ser. No. 126,395
5 Claims. (Cl. 65—168)

This invention relates to new and useful improvements in apparatus for and method of forming sheet glass by vertical draw machines and it is among the objects thereof to provide apparatus for drawing sheet glass vertically between rolls that are especially insulated to retain the heat in portions of the glass sheet they contact and to accelerate the loss of heat in other portions of the sheet as it passes through the vertical annealing tower to obtain isothermal cooling across the sheet.

It is another object of the invention to provide an annealing tower or chamber in which the walls are heated in part and cooled in part to obtain as nearly as possible isothermal temperature conditions transversely of the sheet.

It is still a further object of the invention to provide an annealing chamber for vertical drawn sheet glass with vertically spaced baffles and clean-out doors for intercepting broken glass particles to prevent their accumulation at the bottom of the tower.

It is still a further object of the invention to provide a glass drawing and annealing apparatus in which one of a pair of rolls, of which there are multiples vertically spaced in the annealing chamber, is movable relative to the other roll and it is a further object of the invention to generally insulate the apparatus on the ends, or at the edges of the sheet, the drive rolls, the drive mechanism against heat loss to provide means for cooling the center of said apparatus to obtain a substantially uniform temperature through the width of the sheet and applying cooling means to the bearing elements to avoid failure of the metal parts due to high temperatures to which they are exposed.

These and other objects of the invention will become more apparent from a consideration of the accompanying drawings constituting a part hereof in which like reference characters designate like parts and in which:

FIGURE 1 is a cross-sectional view, partially in elevation, taken along the lines 1—1, FIGURE 5, of a plurality of sections of a vertical draw machine for sheet glass embodying the principles of this invention;

FIGURE 2 is a similar view taken along the line 2—2, FIGURE 5, of sections of the vertical draw machine with access doors, the sections of FIGURE 2 being employed at the bottom portion of the draw machine;

FIGURE 3 is a vertical section of the top portion of the draw machine along line 1—1;

FIGURE 4 is a section of the top portion of the draw machine along line 2—2, partially in elevation;

FIGURE 5 is a cross section, partially in elevation, taken transversely of the draw machine above a pair of rolls;

Figure 8:
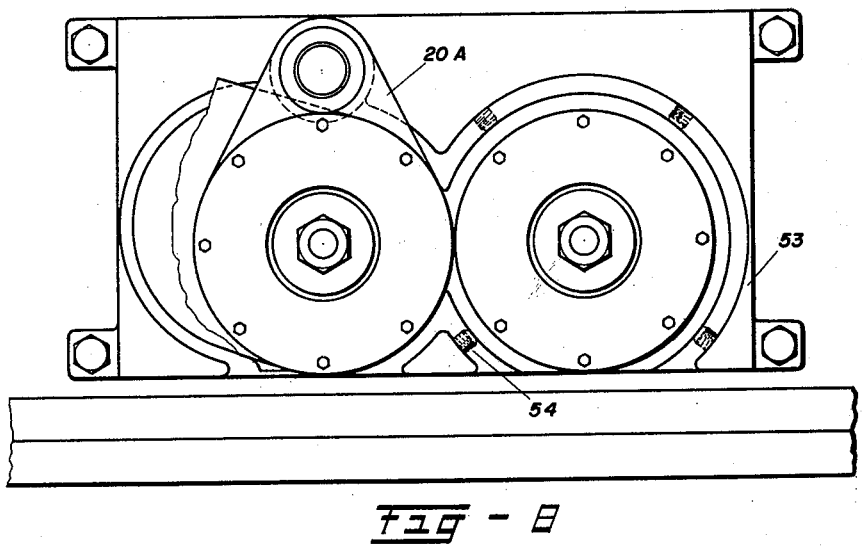
Figure 7:
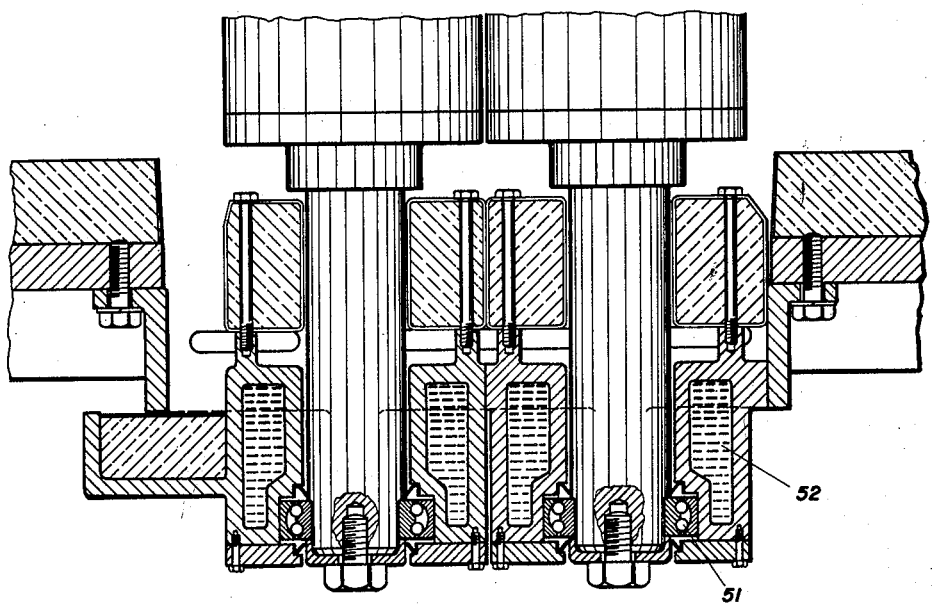
Figure 9:
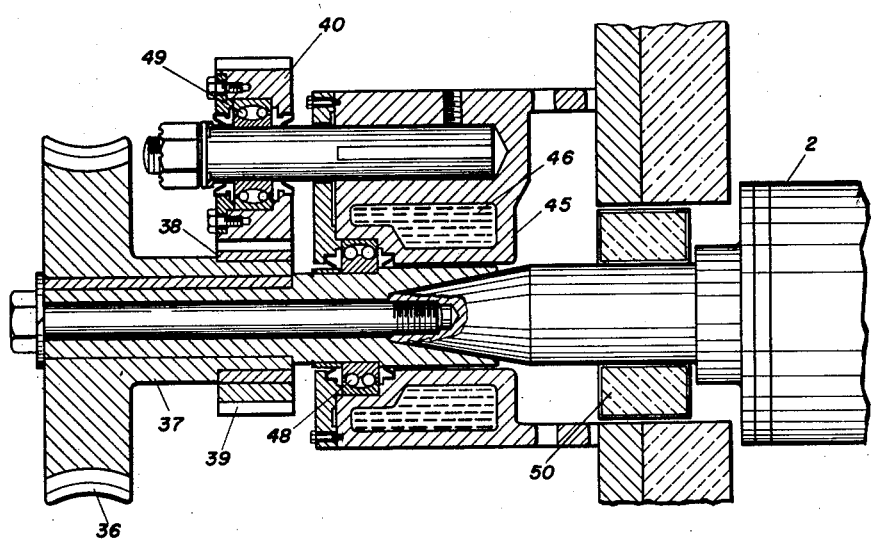
Figure 10:
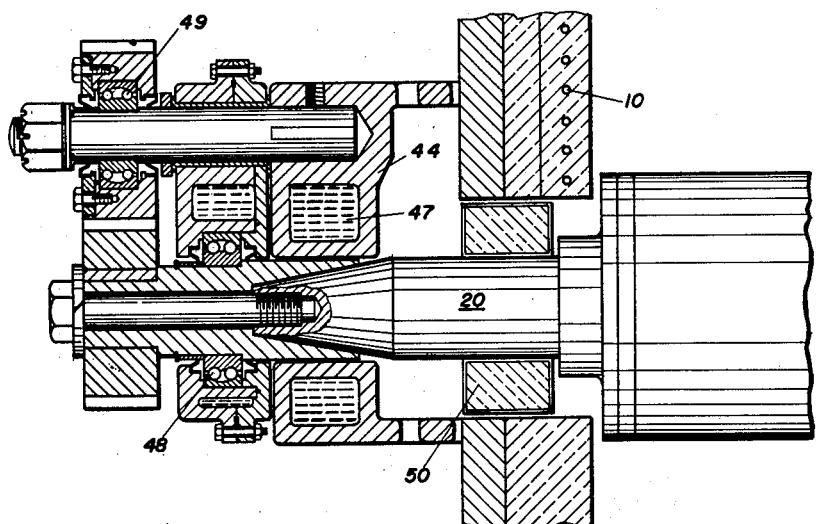
Figure 11:
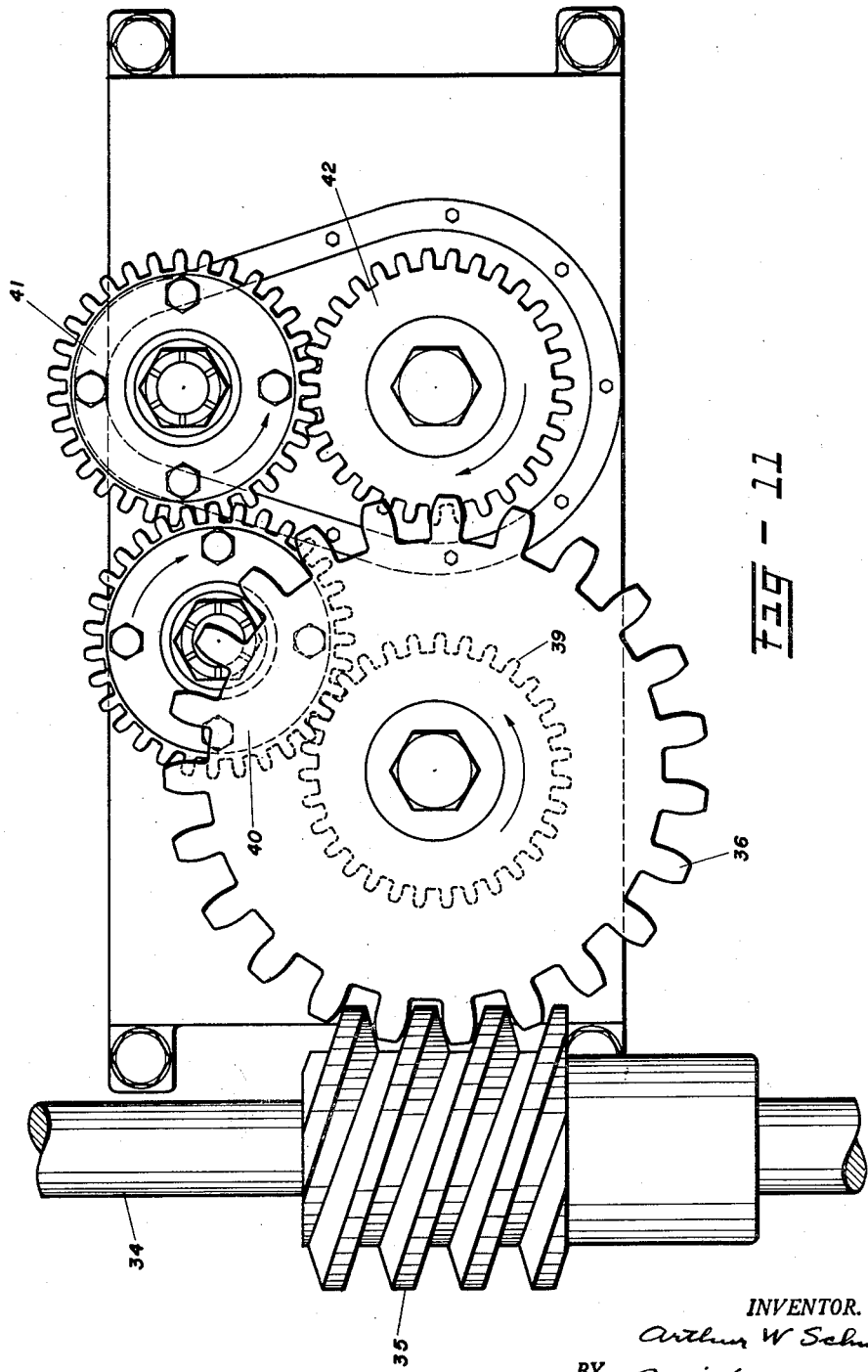

FIGURE 6, a cross section, partially in elevation, of a roll for the vertical draw machine;

FIGURE 7 a cross-sectional view, partially in elevation, of a pair of rolls showing the water cooled bearing elements;

FIGURE 8 an end elevational view of the roll mount and bearing;

FIGURE 9 a cross-section, partially in elevation, of a drive end of a fixed roll;

FIGURE 10 a similar view of the drive end of a hinged roll mount; and,

FIGURE 11 an end elevational view of the drive gears for the drawing rolls.

With reference to FIGURE 2 of the drawing, the numeral 1 generally designates the annealing chamber of a vertical draw machine for sheet glass having mounted therein pairs of rolls generally designated by the numerals 2 and 3 between which the sheet glass A passes vertically upward from the bath of molten glass (not shown) to the cutting machine at the top of the annealing tower or chamber.

The annealing chamber is constituted of a plurality of housing sections that are stacked to any desired height and joined by flanges 4 and 5. Although the sections, as shown in FIGURES 1 and 2, are horizontally disposed as viewed from the side of the drawing, they are actually vertically disposed in use and stacked one above the other.

The sections shown in FIGURE 2 are provided with baffles 6 and doors 7, the latter being hinged at 8 to the wall 9 of the annealing chamber. Each door is provided with electrical heating elements, as shown at 10, the doors being clean-out doors for removing any glass particles that may accumulate between the door and the baffle members 6 so that the glass will not pile up on the drawing head of the machine. In the full height of each section of the drawing machine there are double walls to form air chambers 11 surrounding the inner chamber, the air chambers having air inlets 12 and outlets 13, the latter being connected to manifolds 14 which are joined to other manifolds 14, FIGURE 3 of the drawing, the latter having a conduit 15 leading to a suction fan, not shown. When the fan is operated, the cold air drawn through the inlets 12 passes around the inner wall 16 of the cooling chamber and out through the outlets 13 to manifolds 14 and 15 to the fan. Multiple outlets, FIGURE 1 are provided to hook up with the manifolds, as shown.

FIGURE 5 of the drawing is a transverse section of the vertical draw machine showing the baffles 6 as divided into end sections 6A and 6B and the center section 6, the baffle being divided to provide thermal barriers between the ends and center of the baffles for the purpose as will be hereinafter explained. The central portion of the baffle 6 is sloped, as is shown at 6C, for the purpose of deflecting the glass to the doors in the cooling sections of the draw machine such as in the sections shown in FIGURES 1, 3 and 5 of the drawing.

As appears from FIGURE 5, the end or edges of the draw machine are heated by the electrical heating elements 10 while the central section is cooled by the air ducts 11 separated by valve 11A from the manifold 14. This is for the purpose of supplementing the heat in the drawn sheets near the ends or edges thereof while cooling the same at the central portion to maintain an isothermal condition across the sheets, thereby eliminating the setting up of strains during the annealing process.

To this end also, the drawing rolls 2 and 3 are constructed in a manner to conserve heat at the edges of the roll to thereby maintain proper temperatures at the edge of the sheet and lose heat at the center of the rolls by increasing radiation losses from the glass sheet at that portion of its contact with the rolls. This roll construction is shown in FIGURE 6 of the drawing.

The rolls consist of shafts 20 being tapered at one end at 21 and recessed at the other end at 22. Mounted on the shafts 20 is an insulating material 23 held in place by spacing collars 24 with set screws 25. End collar 26 may be a spider to which sleeve 27 is secured by set screw 28, as shown. The outer portion of the rolls consist of sleeves 29 of asbestos which engage the hot glass sheet that is drawn up from the bottom of the drawing machine.

At the central portion of the roll a metal sleeve 30 is provided in contact with the shaft 21 and sleeve 27 to conduct the heat away from the central portion of the roll to cool the same, the sleeve 27 being connected to the heat conducting sleeve 30 by set screws 31.

The rolls are mounted in the frame of the draw machine in the manner shown in FIGURES 7 to 11 of the drawing and are driven by a common drive shaft 34 shown in FIGURE 11 of the drawing, the shaft having worms 35 that engage the teeth of worm gears 36 having a sleeve portion 37 on which is mounted a pinion 38 having teeth 39 engaging the teeth of gear wheels 40 that are idler gears that mesh with gear wheels 41 that engage the gear wheels 42 of the other of the pair of drawing rolls.

The roll to which the gear wheel 42 is attached is movable and may be swung away from the roll to which the gear 39 is attached, but when moved, gear wheel 42 maintains driving contact through gear wheels 41, 40 and 39, so that both the rolls 2 and 3 revolve simultaneously at the same peripheral speeds.

As shown in FIGURES 7, 9 and 10, the rolls are mounted in water cooled housings 44 and 45 having hollow passages 46 and 47 for a coolant such as water. This cooling action protects the roller bearings 48 and 49 against the high temperatures of the chamber 1 of the drawing machine. It will be noted that in FIGURES 9 and 10 a doughnut-shaped refractory insulating piece 50 moves with the shaft or roll 20 when the movable roll supported in bracket 20a is swung away from the fixed roll to prevent the heat from the drawing machine chamber getting to the bearing elements.

As shown in FIGURE 7, the opposite ends of the rolls are journaled in ball bearings 51 that are kept cool by the coolant in the flow chamber 52 and the rolls and bearing structures are adjustably supported in brackets 53 by the set screws 54, as shown in FIGURE 8 of the drawing.

The operation of the above-described vertical draw machines for sheet glass is briefly as follows:

FIGURES 1, 2, 3 and 4 of the drawings should be viewed from the bottom of the sheet of drawing because the draw machine is vertically disposed with the sheet designated by the reference character "A" being drawn vertically by the rollers 2 and 3. In FIGURE 2 there is shown two sections of the draw machine and FIGURE 4 shows an additional section corresponding to the two sections of FIGURE 2, which are provided with the series of baffles and doors in which the heating elements 10 are mounted in the doors adjacent the end zones of the drawing tower or annealing chamber. In FIGURE 4 a section designated by the reference numeral 60 is mounted on a heated section and in FIGURE 1 two cooling sections are mounted below the section 60 and are provided with the manifolds 14 which connect to a fan through the duct 15.

The steps of supplying the glass and the actual drawing of the glass from the drawing block or whatever method or means is employed for drawing the glass is not shown and is no part of the present invention. After the sheet has been formed, which is when the glass is of a viscosity to be self-sustaining between the rolls, it is drawn vertically through the annealing and cooling chambers by the rolls 2 and 3. The method of removing the finished sheet glass at the top of the annealing tower is not shown and is no part of the present invention.

Because the edges of the machine cool faster by radiation losses and also because the sheet, when drawn, is colder at the edges due to chilling effect, it has been difficult to maintain uniform temperature across the sheet from one edge to the other.

In the ordinary annealing of sheet glass, it is attempted to maintain the edges hot until the center cools and by the present invention this attempt to maintain the edges hot by insulating the machine to reduce radiation losses is supplemented by heating elements which supply heat to the end zones of the sheet while at the same time the cooling effect on the center of the sheet is increased by drawing cold air through the center region of the machine.

It will be noted from FIGURES 1 through 5 that the heating and cooling elements of the sections are offset to the outside to maintain a uniform dimension on the inside the full length of the machine. The heating and cooling effect on the sheet is further controlled by the use of insulating material between the roll shaft and the roll, as shown in FIGURE 6 of the drawing, which is supplied at the end zones of the roll and the use of a conducting material at the center of the roll, FIGURE 6, to remove heat as rapidly as possible from the center portion of the drive rolls.

The effect of the temperature control across the sheet is best illustrated in connection with FIGURE 5 of the drawing, which shows a pair of rolls just above a pair of baffles. The dotted lines B and C show the inner edges of the baffles and the spaced lines D and E show a break between the center portion of the baffles and the portion in the end zones of the rolls, the space between the lines D and E acting as a thermal barrier to prevent the loss of heat from the end portions of the baffles to the center portion. FIGURE 5, in addition, to the heating elements 10 on the doors adjacent the end zones of the rolls shows heating elements 10A and 10B which prevent the loss of heat from the rolls to the end walls of the annealing chamber.

As the sheet A progressively passes between the rolls from the bottom to the top of the drawing machine, the edges or sides of the sheet are maintained at suitable temperatures while the central portion is cooled by the air ducts 11 passing adjacent the central wall portion to reduce the temperature of the central part of the sheet until the glass has been suitably annealed by taking it through the critical temperature zone, which is reached at some point in the vertical travel of the sheet after which it passes into a neutral section like the section 60 in which isothermal temperature conditions need not be maintained across the entire width of the sheet.

The fan will draw regulable amounts of cooling air through the manifolds 14 and through the ducts 11 into which the air is drawn from the inlets 12 and pass vertically upward in wiping contact with the metal wall, as shown in FIGURE 5 of the drawing.

Any broken glass resulting from the drawing operation is intercepted by the baffles 6 and removed through the doors 7 so that it will not accumulate at the bottom of the drawing machine.

The water cooled bearings for the rolls and drive mechanism prevent damage due to the heat of the drawing tower walls and in addition to the cooling, the bearing and drive mechanism is heat insulated as by the doughnut shaped elements 50, FIGURE 10 of the drawing.

It is evident from the foregoing description of this invention that besides the retention of heat in the end zones of the rolls by insulation, heat may be additionally supplied to assure that the edges of the glass sheet are hot until the center portions are cooled and by means of the controlled heating of the edges and the controlled cooling of the center portion, isothermal conditions are maintained throughout the width of the sheet at all critical stages of the glass drawing operation. Because of this, the drawing machine can be constructed of a minimum number of sections and be of a minimum height for the vertical drawing of sheet glass within a limited working space.

Although one embodiment of the invention has been herein illustrated and described, it will be evident to those skilled in the art that various modifications may be made in the details of construction without departing from the principles herein set forth.

I claim:

1. In a vertical draw machine for forming and annealing sheet glass, a plurality of housing sections in superposed relation with their ends abutting to constitute a continuous annealing chamber through which the glass is drawn, and a plurality of rolls in vertically spaced relation for guiding and drawing the glass, the inner walls of said housing sections having baffles and said walls having clean-out doors adjacent said baffles and having heating elements in the walls adjacent the ends of said rolls, said rolls having heat insulation at the ends thereof and being provided with means for accelerating heat loss at the centers thereof.

2. In a vertical draw machine for forming and annealing sheet glass, a plurality of housing sections in superposed relation with their ends abutting to constitute a continuous annealing chamber through which the glass is drawn, and a plurality of rolls in vertically spaced relation for guiding and drawing the glass, the inner walls of said housing sections having baffles and said walls having clean-out door adjacent said baffles and having heating elements in the walls adjacent the ends of said rolls, said rolls comprising a composite structure with a steel shaft and an outer roll sleeve of asbestos and an intermediate metal sleeve supporting said outer roll sleeve, said intermediate roll being spaced from said steel shaft by insulating sleeves at the ends of the shaft to retard heat loss from the glass engaged by the outer sleeve through the roll and being supported by a heat conducting metal sleeve at the center of the roll to accelerate the heat loss from the glass through the roll at the center of the sheet.

3. Apparatus as set forth in claim 1 in which the rolls are journaled in opposite walls of the housing section in water cooled bearings and the walls intermediate the walls in which the rolls are journaled having air chambers extending vertically the length of the housing sections opposite the center of the rolls with means for drawing cold air through said air chambers, said means including manifolds connected to a fan, the manifolds being connected at the upper ends of the air chambers and said air chambers having openings at their lower end for admitting air to said chambers.

4. Apparatus as set forth in claim 1 in which the baffles extend on the inner walls of the housing sections co-extensive with the length of the rolls, said baffles having deflecting portions at the center and being divided by spaces intermediate the center and the ends of the baffles to produce thermal barriers between the center and the ends of the annealing chamber and rolls.

5. Apparatus as set forth in claim 1 in which the baffles extend on the inner walls of the housing sections co-extensive with the length of the rolls, said baffles having deflecting portions at the center and being divided by spaces intermediate the center and the ends of the baffles to produce thermal barriers between the center and the ends of the annealing chamber and rolls, said housing sections having heating elements co-extensive with the end baffle sections to supply heat to the ends of the rolls and the glass sheet passing therebetween.

References Cited in the file of this patent
UNITED STATES PATENTS

| | | |
|---|---|---|
| 1,882,262 | Spinasse | Oct. 11, 1932 |
| 2,571,239 | Hart | Oct. 16, 1951 |
| 2,763,894 | Bulkley et al. | Sept. 25, 1956 |
| 2,952,097 | Atkeson | Sept. 13, 1960 |